United States Patent
Gwidt et al.

(10) Patent No.: US 8,342,151 B2
(45) Date of Patent: Jan. 1, 2013

(54) DEACTIVATION OF HIGH PRESSURE PUMP FOR NOISE CONTROL

(75) Inventors: Jesse M. Gwidt, Brighton, MI (US); Dustin L. Gardner, Royal Oak, MI (US); Michael J. Lucido, Northville, MI (US); Bjorn E. Soderstrom, West Bloomfield, MI (US)

(73) Assignee: GM Global Technology Operations LLC

( * ) Notice: Subject to any disclaimer, the term of this patent is extended or adjusted under 35 U.S.C. 154(b) by 692 days.

(21) Appl. No.: 12/338,093

(22) Filed: Dec. 18, 2008

(65) Prior Publication Data

US 2010/0154739 A1 Jun. 24, 2010

(51) Int. Cl.
*F02D 1/02* (2006.01)

(52) U.S. Cl. ......... 123/357; 123/332; 123/446; 123/457

(58) Field of Classification Search ................. 123/325, 123/332, 333, 357, 359, 446, 456, 457
See application file for complete search history.

(56) References Cited

U.S. PATENT DOCUMENTS

| | | | | |
|---|---|---|---|---|
| 5,025,770 A | * | 6/1991 | Richardson | 123/585 |
| 5,715,790 A | * | 2/1998 | Tolley et al. | 123/396 |
| 5,735,254 A | * | 4/1998 | Palara et al. | 123/644 |
| 6,470,851 B1 | * | 10/2002 | DeGroot et al. | 123/323 |
| 7,093,584 B1 | * | 8/2006 | Potter et al. | 123/447 |
| 7,975,674 B2 | * | 7/2011 | Kylstrom et al. | 123/495 |
| 2005/0193992 A1 | * | 9/2005 | Shin | 123/529 |
| 2006/0118089 A1 | | 6/2006 | Tokuo et al. | 123/458 |
| 2008/0264386 A1 | * | 10/2008 | Watanabe et al. | 123/456 |
| 2009/0114191 A1 | * | 5/2009 | Pursifull et al. | 123/447 |
| 2009/0126688 A1 | * | 5/2009 | Borg et al. | 123/446 |
| 2009/0241908 A1 | * | 10/2009 | Tokuo et al. | 123/476 |
| 2010/0043759 A1 | * | 2/2010 | Kylstrom et al. | 123/495 |

FOREIGN PATENT DOCUMENTS

| | | |
|---|---|---|
| CN | 101194093 | 6/2008 |
| DE | 102005006154 A1 | 9/2005 |
| DE | 102005014093 A1 | 10/2006 |
| EP | 1327766 A2 | 7/2003 |

OTHER PUBLICATIONS

German Office Action dated Jul. 16, 2012 for Application 10 2009 058 391.2; 6 pages.

\* cited by examiner

*Primary Examiner* — Erick Solis

(57) ABSTRACT

An engine control system comprises an engine speed monitoring module and a pump control module. The engine speed monitoring module compares an engine speed and a predetermined threshold. The pump control module deactivates a pressure pump based on said comparison.

6 Claims, 4 Drawing Sheets

US 8,342,151 B2

DEACTIVATION OF HIGH PRESSURE PUMP FOR NOISE CONTROL

FIELD

The present disclosure relates to high pressure pump control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 is shown. Air is drawn into an engine 102 through an intake manifold 104. A throttle valve 106 is actuated by an electronic throttle control (ETC) motor 108 to vary the volume of air drawn into the engine 102. The air mixes with fuel from one or more fuel injectors 110 to form an air-fuel mixture. The air-fuel mixture is combusted within one or more cylinders 112 of the engine 102. Resulting exhaust gas is expelled from the cylinders to an exhaust system 113.

Fuel is supplied to the engine 102 by a fuel system. For example only, the fuel system may include the fuel injectors 110, a fuel tank 114, a low pressure pump 115, a high pressure pump 116, and a fuel rail 118. Fuel is stored within the fuel tank 114. The low pressure pump 115 draws fuel from the fuel tank 114 and provides fuel to the high pressure pump 116. The high pressure pump 116 provides pressurized fuel to the fuel injectors 110 via the fuel rail 118.

An engine control module (ECM) 120 receives a rail pressure signal from a rail pressure sensor 122. The rail pressure signal indicates the pressure of the fuel within the fuel rail 118. The ECM 120 controls the amount and the timing of the fuel injected by the fuel injectors 110. The rail pressure decreases each time fuel is injected by one or more of the fuel injectors 110. The ECM 120 maintains the rail pressure via the high pressure pump 116.

The speed of the engine 102 is measured by a revolutions per minute (RPM) sensor 124. The RPM sensor 124 provides the ECM 120 with the measured RPM.

SUMMARY

An engine control system comprises an engine speed monitoring module and a pump control module. The engine speed monitoring module compares an engine speed and a predetermined threshold. The pump control module deactivates a pressure pump based on the comparison. In further features, the engine speed monitoring module determines whether the engine speed is less than or equal to the predetermined threshold, and the pressure pump is deactivated based on the determination. In other features, the engine control system further comprises a fuel injector control module that adjusts a timing of actuation of a fuel injector based on the comparison.

In other features, the engine control system further comprises a fuel injector control module that adjusts a length of time of actuating a fuel injector based on the comparison. In still other features, the pump control module deactivates the pressure pump by adjusting a valve. In still other features, the engine speed monitoring module compares the engine speed to a second predetermined threshold, and the pump control module suspends deactivating the pressure pump when the engine speed is greater than or equal to the second predetermined threshold.

In other features, the engine speed monitoring module additionally compares an engine speed idle time and a predetermined period of time, and the pump control module deactivates the pressure pump based on the additional comparison. In other features, the engine speed monitoring module determines whether the engine speed idle time is greater than or equal to the predetermined period of time, and the pressure pump is deactivated based on the determination.

An engine control method comprises comparing an engine speed and a predetermined threshold, and deactivating a pressure pump based on the comparison. In further features, the engine control method further comprises determining whether the engine speed is less than or equal to the predetermined threshold, and deactivating the pressure pump based on the determination. In further features, the engine control method further comprises adjusting a timing of actuation of a fuel injector based on the comparison.

In other features, the engine control method further comprises adjusting a length of time of actuating a fuel injector based on the comparison. In other features, the engine control method further comprises deactivating the pressure pump by adjusting a valve In other features, the engine control method further comprises comparing the engine speed to a second predetermined threshold, and suspending deactivation of the pressure pump when the engine speed is greater than or equal to the second predetermined threshold.

In other features, the engine control method further comprises additionally comparing an engine speed idle time and a predetermined period of time, and deactivating the pressure pump based on the additional comparison. In other features, the engine control method further comprises determining whether the engine speed idle time is greater than or equal to the predetermined period of time, and deactivating the pressure pump based on the determination.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
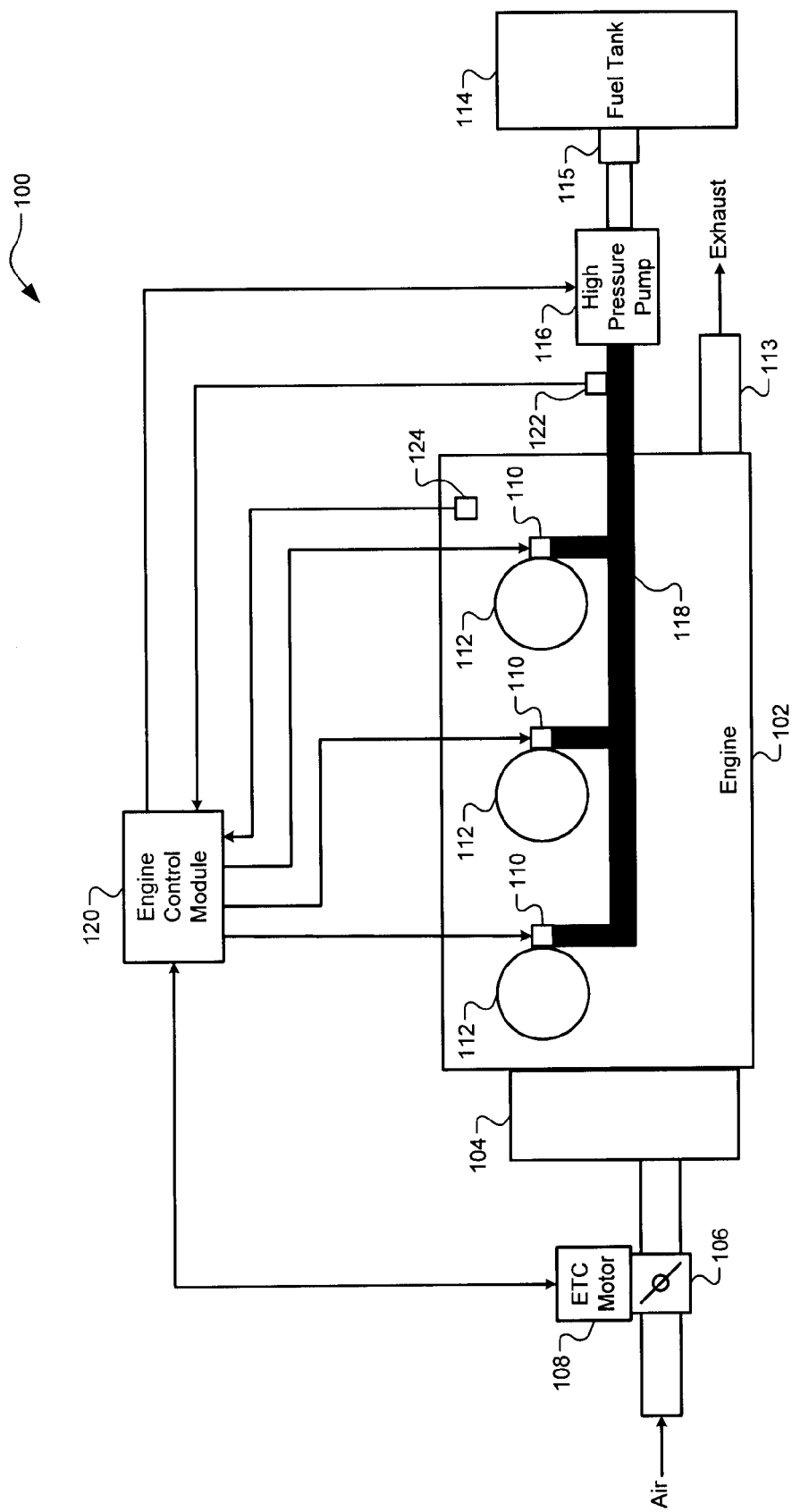
FIG. 1 is a functional block diagram of an engine system.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A high pressure pump supplies pressurized fuel to a fuel rail. Fuel injectors are connected to the fuel rail and inject the pressurized fuel into a cylinder. The pressure within the fuel rail decreases as the fuel injectors inject more fuel. The rail pressure is monitored to determine whether the high pressure pump may supply more pressurized fuel.

The high pressure pump of the present disclosure is deactivated based on speed of an engine. When the high pressure pump is deactivated, the pressure within the fuel rail is not maintained. Fuel is supplied to the fuel rail by a low pressure pump and the pressure within the fuel rail decreases. The amount and timing of the fuel injected by the fuel injectors are modified to accommodate for the change in pressure.

Figure 2:
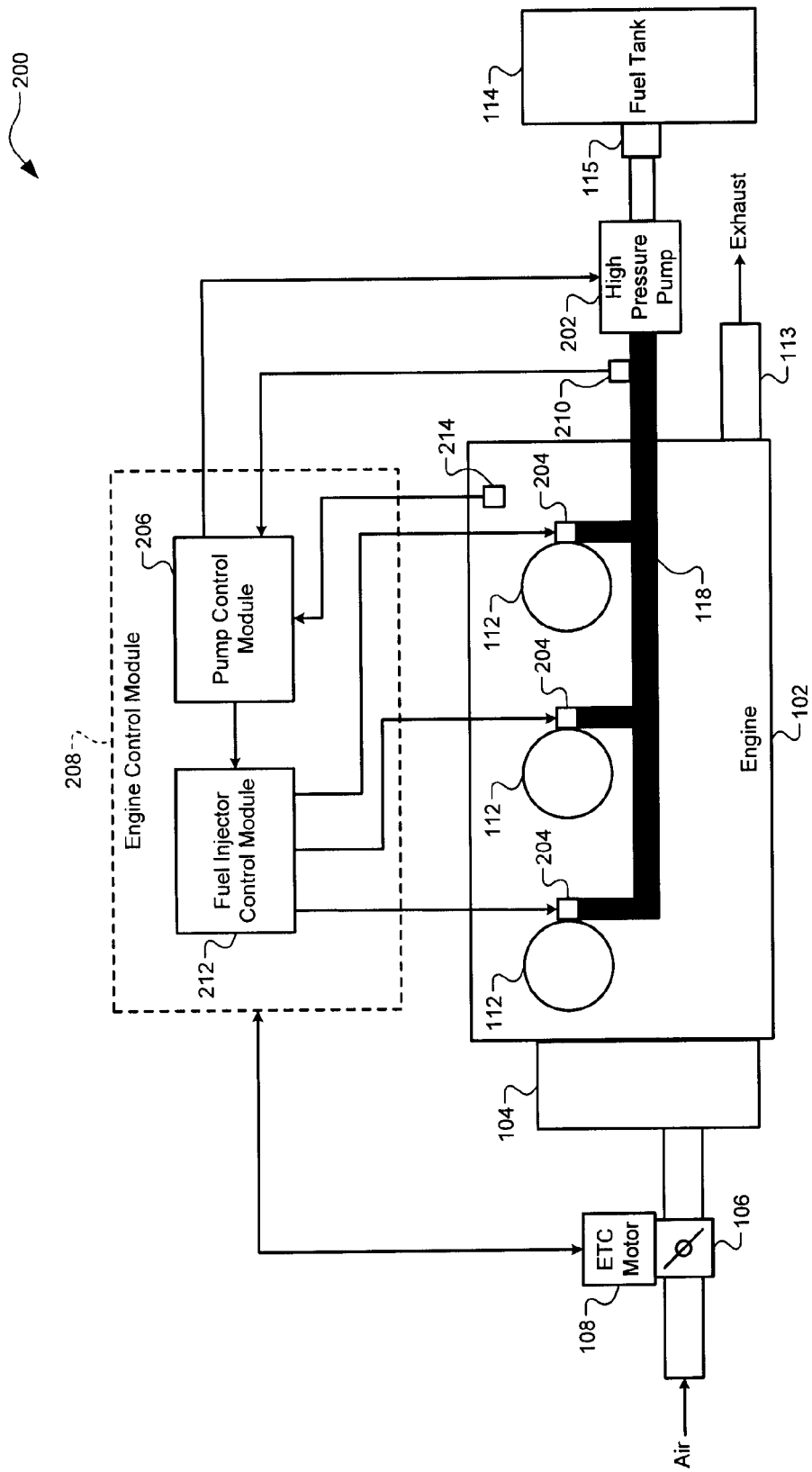
FIG. 2 is a functional block diagram of an exemplary engine system according to the principles of the present disclosure.

Referring now to FIG. 2, a functional block diagram of an engine system 200 according to the principles of the present disclosure is shown. A high pressure pump 202 provides pressurized fuel to fuel injectors 204 via the fuel rail 118. The high pressure pump 202 is controlled by a pump control module 206 that may be located within an ECM 208.

The pump control module 206 receives a rail pressure signal from a rail pressure sensor 210. The rail pressure signal indicates the pressure of the fuel within the fuel rail 118. A fuel injector control module 212 controls the amount and the timing of the fuel injected by the fuel injectors 204. The rail pressure decreases each time fuel is injected by one or more of the fuel injectors 204. The pump control module 206 maintains the rail pressure via the high pressure pump 202. The pressure of the fuel exiting the high pressure pump 202 may be greater than the pressure of the fuel exiting the low pressure pump 115. For example only, the pressure of the fuel exiting the high pressure pump 202 may be between 2-26 Mpa, while the pressure of the fuel exiting the low pressure pump 115 may be between 0.3-0.6 Mpa.

The high pressure pump 202 includes a valve (not shown) that controls the pressure of fuel exiting the high pressure pump 202. When the valve is fully open, the pressure of the fuel exiting the high pressure pump 202 is the same as the pressure of the fuel entering the high pressure pump 202. By adjusting the valve to a position that is less than fully open, the pressure of the fuel exiting the high pressure pump 202 increases. The pump control module 206 may deactivate the high pressure pump 202. For example only, the high pressure pump 202 may be deactivated by adjusting the valve to the fully open position.

When the high pressure pump 202 is deactivated, the fuel injector control module 212 adjusts the amount and the timing of the fuel injected by the fuel injectors 204. For example, the pump control module 206 may generate a deactivation signal when the high pressure pump 202 is deactivated. The fuel injector control module 212 may adjust the amount and the timing of the fuel injected by the fuel injectors based on the deactivation signal.

The speed of the engine 102 is measured by a revolutions per minute (RPM) sensor 214. The RPM sensor 214 provides the ECM 208 with the measured RPM. For example, the RPM sensor 214 may generate a RPM signal. The pump control module 206 receives the RPM signal from the RPM sensor 214. Based on the RPM signal, the pump control module 206 may deactivate the high pressure pump 202. For example only, the high pressure pump 202 may be deactivated when the RPM signal indicates that the RPM is less than or equal to a predetermined threshold. For example, if the high pressure pump 202 is deactivated, then the pump control module 206 generates a deactivation signal.

The fuel injector control module 212 modifies the timing and amount of fuel injected by the fuel injectors 204 when the deactivation signal is generated. The pump control module 206 resumes controlling the high pressure pump 202 and suspends generating the deactivation signal when the RPM is greater than the predetermined threshold.

Figure 3:
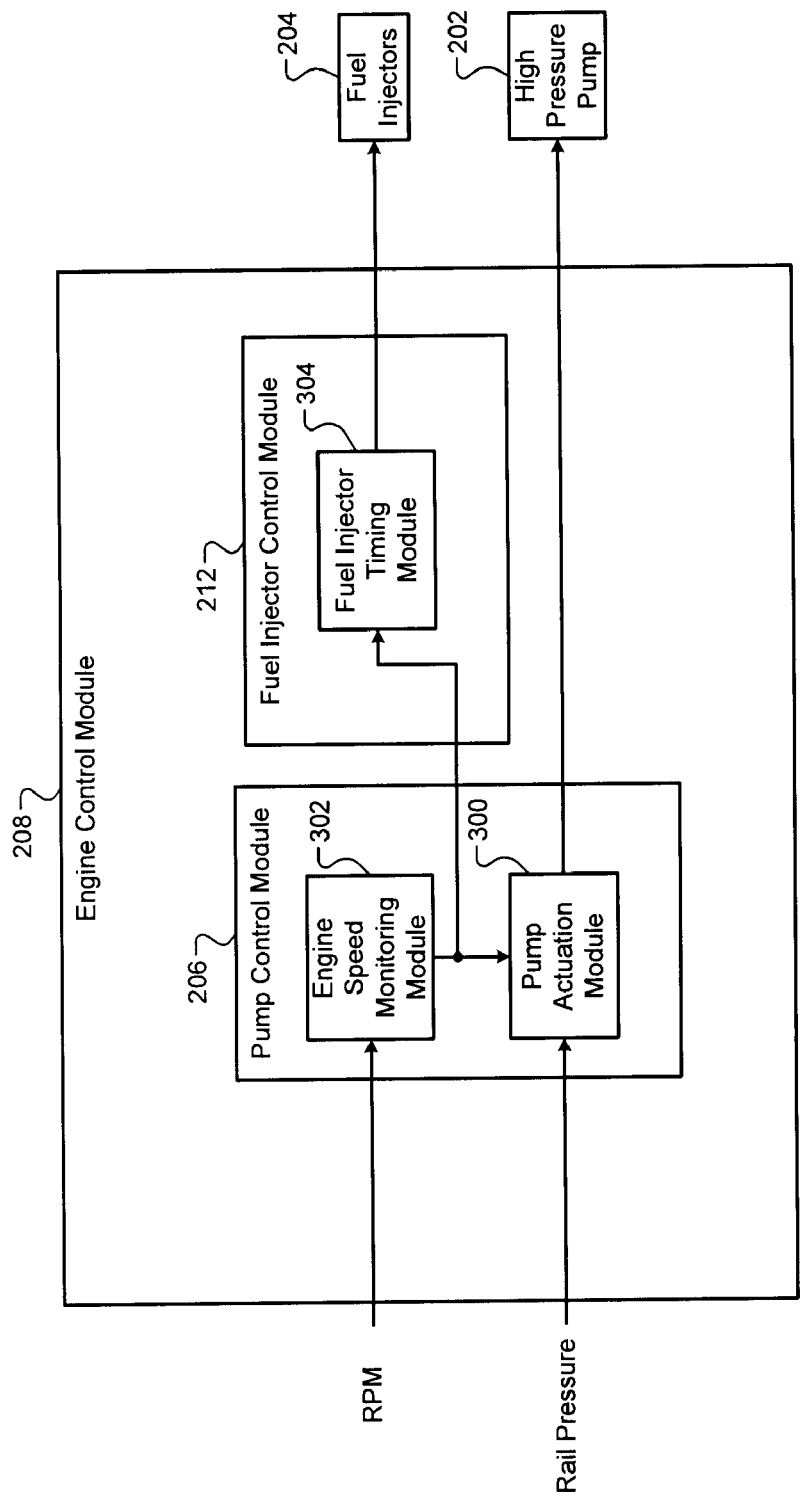
FIG. 3 is an exemplary implementation of the engine control module 208 of FIG. 2 according to the principles of the present disclosure.

Referring now to FIG. 3, an exemplary implementation of the engine control module of FIG. 2 according to the principles of the present disclosure is shown. The pump control module 206 includes a pump actuation module 300 and an engine speed monitoring module 302. The pump actuation module 300 controls actuation of the high pressure pump 202 based on rail pressure. The engine speed monitoring module 302 monitors the RPM signal.

The engine speed monitoring module 302 determines whether the RPM signal indicates that the RPM is less than or equal to a predetermined threshold. If the RPM is less than or equal to the predetermined threshold, then the engine speed monitoring module 302 generates a deactivation signal. In various implementations, the engine speed monitoring module 302 may generate the deactivation signal when the RPM is idle for at least a predetermined amount of time.

The engine speed monitoring module 302 may generate the deactivation signal until the RPM is greater than a second predetermined threshold. In various implementations, the second predetermined threshold may be equal to the predetermined threshold. The pump actuation module 300 and a fuel injector timing module 304 receive the deactivation signal.

The pump actuation module 300 suspends actuation of the high pressure pump 202 when the deactivation signal is generated. The pump actuation module 300 may suspend actuation of the high pressure pump 202 based on the deactivation signal. When actuation of the high pressure pump 202 is suspended, the pressure within the fuel rail 118 decreases.

The fuel injector timing module 304 may be located within the fuel injector control module 212. The fuel injector timing module 304 controls the amount and the timing of the fuel injected by the fuel injectors 204. For example only, the fuel injector timing module 304 may generate a fuel signal to control the opening of the fuel injectors 204. By changing the timing of generating the fuel signal and the pulse width of the fuel signal, then the amount and timing of fuel injection changes. When the deactivation signal is generated, the fuel injector timing module 304 modifies the amount and the timing of the fuel injected by the fuel injectors 204.

The fuel injector timing module 304 may continue modifying the generation of the fuel signal until the engine speed monitoring module 302 suspends generating the deactivation signal. When the deactivation signal is suspended, then the fuel injector timing module 304 may resume controlling the fuel injectors 204 as before the modifications to the fuel signal.

Figure 4:
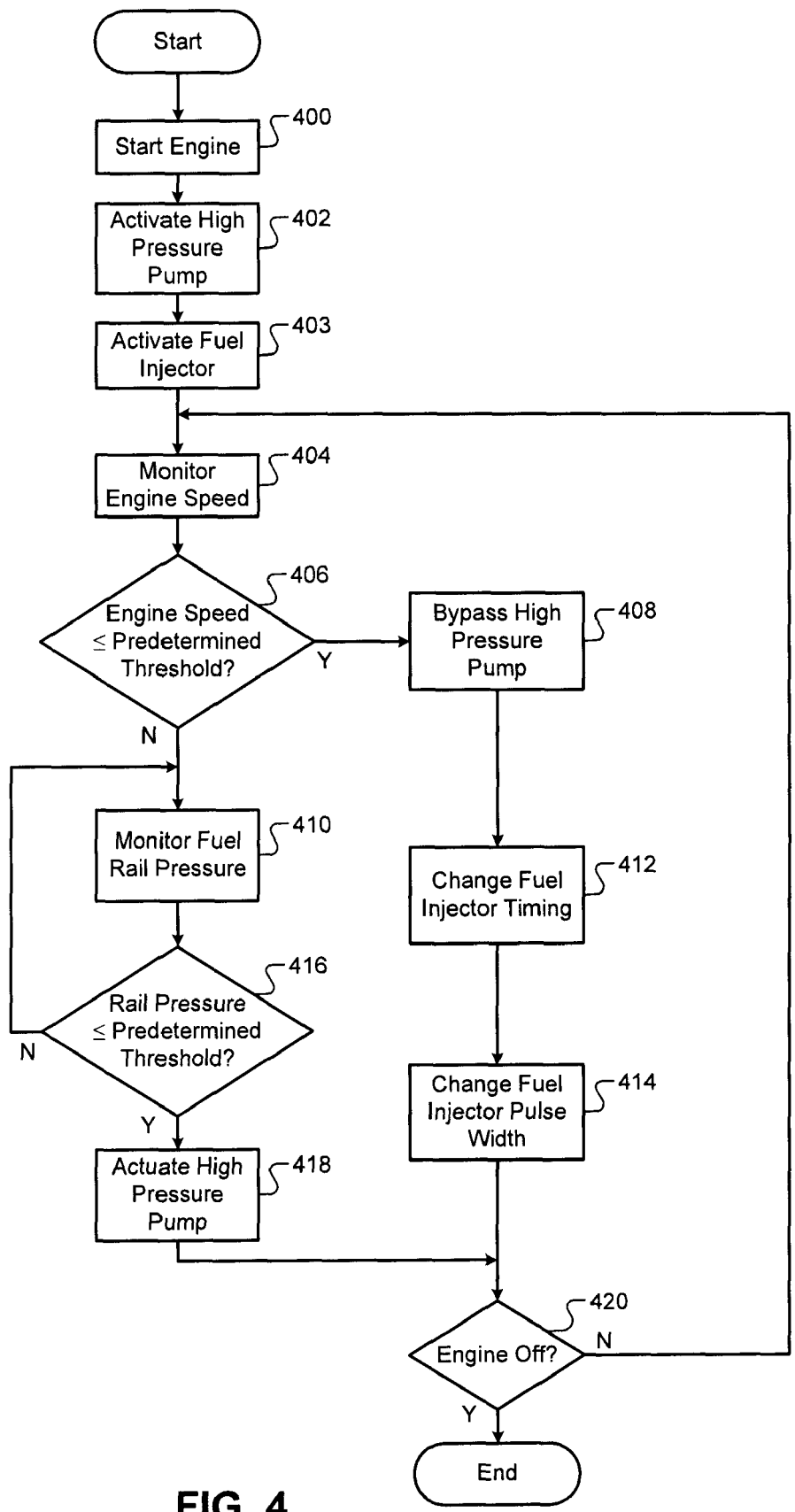
FIG. 4 is a flowchart that depicts exemplary steps performed in deactivating the high pressure pump 202 of FIG. 2 according to the principles of the present disclosure.

Referring now to FIG. 4, a flowchart that depicts exemplary steps performed in deactivating the high pressure pump 202 of FIG. 3 according to the principles of the present disclosure. Control begins in step 400 where an engine is started. In step

402, control activates a high pressure pump. In step 403, control activates a fuel injector. In step 404, control monitors engine speed.

In step 406, control determines whether the engine speed is less than a predetermined threshold. If control determines that the engine speed is less than the predetermined threshold, then control transfers to step 408; otherwise, control transfers to step 410. In step 408, control deactivates the high pressure pump. In step 412, control changes fuel injector timing. In step 414, control changes fuel injector pulse width.

In step 410, control monitors fuel rail pressure. In step 416, control determines whether the fuel rail pressure is less than a predetermined threshold. If control determines that the fuel rail pressure is less than the predetermined threshold, then control transfers to step 418; otherwise, control returns to step 410.

In step 418, control actuates the high pressure pump. In step 420, control determines whether the engine is off. If control determines that the engine is off, then control ends; otherwise, control returns to step 404.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
    an engine speed monitoring module that compares an engine speed and a first predetermined threshold;
    a pump control module that deactivates a pressure pump in response to said engine speed being less than said first predetermined threshold for at least a predetermined amount of time, and that reactivates said pressure pump in response to said engine speed being greater than a second predetermined threshold; and
    a fuel injector module that changes fuel injector timing and a fuel injector pulse width in response to deactivating said pressure pump and said engine speed being less than said first predetermined threshold.

2. The engine control system of claim 1 wherein said pump control module deactivates said pressure pump by adjusting a valve.

3. The engine control system of claim 1 wherein said engine speed being less than said first predetermined threshold corresponds to engine idle.

4. An engine control method comprising:
    comparing an engine speed and a first predetermined threshold;
    deactivating a pressure pump in response to said engine speed being less than said first predetermined threshold for at least a predetermined amount of time;
    reactivating said pressure pump in response to said engine speed being greater than a second predetermined threshold; and
    changing fuel injector timing and a fuel injector pulse width in response to deactivating said pressure pump and said engine speed being less than said first predetermined threshold.

5. The engine control method of claim 4 further comprising deactivating said pressure pump by adjusting a valve.

6. The engine control method of claim 4 wherein said engine speed being less than said first predetermined threshold corresponds to engine idle.

* * * * *